United States Patent Office 3,356,683
Patented Dec. 5, 1967

3,356,683
CHEMICAL COMPOUNDS
Jack Bernstein and Kathryn A. Losee, New Brunswick, N.J., assignors, by mesne assignments, to E. R. Squibb & Sons, Inc., New York, N.Y., a corporation of Delaware
No Drawing. Filed June 3, 1965, Ser. No. 461,193
4 Claims. (Cl. 260—295)

This invention relates to new chemical compounds and more particularly to mixed anhydrides of 1-hydroxy-2(1H)-pyridones and carboxylic acids.

The preferred compounds of this invention are those of the general formula

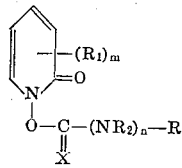

wherein R is an organic radical of less than twelve carbon atoms, $R_1$ is hydrogen, lower alkyl, lower alkoxy, phenyl-(lower alkoxy), nitro, or halogen, $m$ is a positive integer less than five (preferably one), $n$ is zero or one, X is oxygen or sulfur, and $R_2$ is hydrogen or lower alkyl. Suitable values for R include: lower alkyl (e.g., methyl, ethyl, propyl, butyl, pentyl and n-hexyl); lower alkenyl (e.g., vinyl, allyl, isopropenyl, butenyl, pentenyl and hexenyl); lower alkadienyl (e.g., pentadienyl); lower akynyl (e.g., ethynyl and propynyl); phenyl; naphthyl; lower alkyl, lower alkoxy, nitro, trifluoromethyl or halo substituted phenyl; and lower alkyl, lower alkoxy, nitro, trifluoromethyl, or halo substituted naphthyl.

The compounds are prepared by the processes of this invention, one of which essentially comprises interacting a 1-hydroxy-2(1H)-pyridone of the formula

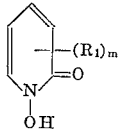

wherein $R_1$ and $m$ are as hereinbefore defined, with an acyl halide of the formula: R—CO(halo), wherein R is as hereinbefore defined. Those compounds wherein $n$ is one are prepared by the second process of this invention which comprises reacting a 1-hydroxy-2(1H)-pyridone of the formula given hereinbefore, with an isocyanate or thioisocyanate of the formula: R—NCX, wherein R and X are hereinbefore defined, or with a carbanyl chloride of the formula:

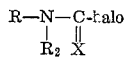

wherein R, $R_2$ and X are as hereinbefore defined.

The compounds of this invention are physiologically active substances that possess antibacterial activity when administered topically.

The following examples illustrate the invention (all temperatures being in centigrade):

EXAMPLE 1

*Anhydride of 1-hydroxy-2(1H)-pyridone and benzoic acid*

11.1 g. of 1-hydroxy-2(1H)-pyridone and 10.1 g. of N-methyl-morpholine are dissolved in 250 cc. of dry chloroform and 14 g. of benzoyl chloride are added dropwise at 25°. There is a temperature rise to 36°. After complete addition, the mixture is refluxed for two hours, cooled and the solvent removed under reduced pressure. The residue is triturated with ether and the insoluble solid filtered. This solid is triturated with water and filtered to yield about 10 g. the anhydride of 1-hydroxy-2(1H)-pyridone and benzoic acid, M.P. about 140–142°. After recrystallization from benzene the compound melts at about 140–142°.

*Analysis.*—Calcd. for $C_{12}H_9NO_3$: N, 6.51; C, 66.97; H, 4.21. Found: N, 6.43; C, 66.93; H, 4.22.

EXAMPLE 2

*Anhydride of 1-hydroxy-2(1H)-pyridone and methylcarbamic acid*

11.1 g. of 1-hydroxy-2(1H)-pyridone is suspended in 150 cc. of chloroform and 5.7 g. of methyl isocyanate in 50 cc. of chloroform is added dropwise at 22° over a period of one-half hour. There is a temperature rise to 27° and a dark brown solution forms. This is refluxed for one hour, cooled and the solvent removed under reduced pressure to yield about 18 g. of solid anhydride of 1-hydroxy-2(1H)-pyridone and methylcarbamic acid, M.P. about 140–142°. This is recrystallized from 300 cc. of ethyl acetate to yield about 7 g. of product, M.P. about 148–150°. Recrystallization from 300 cc. of ethyl acetate yields about 3.6 g. of pure product melting at about 149–151°.

*Analysis.*—Calcd. for $C_7H_8N_2O_3$: C, 49.99; N, 16.66; H, 4.78. Found: C, 50.14; N, 16.80; H, 5.12.

EXAMPLE 3

*Anhydride of 1-hydroxy-2(1H)-pyridone and acetic acid*

Following the procedure of Example 1, but substituting an equivalent amount of acetyl chloride for the benzoyl chloride, the anhydride of 1-hydroxy-2(1H)-pyridone and acetic acid is formed.

EXAMPLE 4

*Anhydride of 1-hydroxy-4-methyl-2(1H)-pyridone and benzoic acid*

Following the procedure of Example 1, but substituting an equivalent amount of 1-hydroxy-4-methyl-2(1H)-pyridone for the 1-hydroxy-2(1H)-pyridone, the anhydride of 1-hydroxy-4-methyl-2(1H)-pyridone and benzoic acid is obtained.

EXAMPLE 5

*Anhydride of 1-hydroxy-5-bromo-2(1H)-pyridone and benzoic acid*

Following the procedure of Example 1, but substituting an equivalent amount of 1-hydroxy-5-bromo-2(1H)-pyridone for the 1-hydroxy-2(1H)-pyridone, the anhydride of 1-hydroxy-5-bromo-2(1H)-pyridone and benzoic acid is obtained.

EXAMPLE 6

*Anhydride of 1-hydroxy-6-bromo-2(1H)-pyridone and acrylic acid*

Following the procedure of Example 1, but substituting an equivalent amount of 1-hydroxy-6-bromo-2(1H)-pyridone for the 1-hydroxy-2(1H)-pyridone and an equivalent amount of acrylyl chloride for the benzoyl chloride, the anhydride of 1-hydroxy-6-bromo-2(1H)-pyridone and acrylic acid is obtained.

EXAMPLE 7

*Anhydride of 1-hydroxy-2(1H)-pyridone and phenylcarbamic acid*

Following the procedure of Example 2, but substituting an equivalent amount of phenylisocyanate for the methylisocyanate, the anhydride of 1 - hydroxy - 2(1H)-pyridone and phenylcarbamic acid is obtained.

EXAMPLE 8

*Anhydride of 1-hydroxy-2(1H)-pyridone and phenyldithiocarbamic acid*

Following the procedure of Example 2, but substituting an equivalent amount of phenylisothiocyanate for the methylisocyanate, the anhydride of 1-hydroxy-2(1H)-pyridone and phenyldithiocarbamic acid is obtained.

EXAMPLE 9

*Anhydride of 1-hydroxy-2(1H)-pyridone and diethyldithiocarbamic acid*

Following the procedure of Example 1, but substituting an equivalent amount of diethylthiocarbamyl chloride for the benzoyl chloride, the anhydride of 1-hydroxy-2(1H)-pyridone and diethyldithiocarbamic acid is formed.

EXAMPLE 10

*Anhydride of 1-hydroxy-2(1H)-pyridone and N-methyl-N (m-tolyl)-dithiocarbamic acid*

Following the procedure of Example 1, but substituting an equivalent amount of N-methyl-N(m-tolyl)thiocarbamyl chloride for the benzoyl chloride, the anhydride of 1-hydroxy-2(1H)-pyridone and N-methyl-N(m-tolyl) dithiocarbamic acid is obtained.

The invention may be variously otherwise embodied within the scope of the appended claims.

What is claimed is:
1. An anhydride of the formula

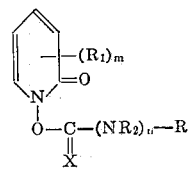

wherein $n$ represents 0 or 1; R, when $n$ represents 0, is selected from the group consisting of lower alkadienyl, lower alkynyl, phenyl and lower alkyl-phenyl; R, when $n$ represents 1, is selected from the group consisting of lower alkyl, phenyl and m-tolyl; $R_1$ is selected from the group consisting of hydrogen, lower alkyl and halogen; $m$ is 0 or 1; X is selected from the group consisting of oxygen and sulfur and $R_2$ is selected from the group consisting of hydrogen and lower alkyl.

2. A compound in accordance with claim 1 having the name 1-benzoyloxy-2(H)-pyridone.

3. A compound in accordance with claim 1 wherein $n$ is 1 and R is lower alkyl.

4. A compound in accordance with claim 3 having the name 1-methylcarbamyloxy-2(1H)-pyridone.

References Cited

UNITED STATES PATENTS 2,951,786    9/1960    Pullen et al. _____ 167—30

OTHER REFERENCES

Noller: Chemistry of Organic Compounds, 2nd Saunders (1957), pp. 161, 317, 325, 236.

Paquette: J. Am. Chemical Soc., vol. 87, March 1965, p. 1407.

Chemical Abstracts: vol. 58, subject index page 1880-s (1963).

WALTER A. MODANCE, *Primary Examiner.*

JOHN D. RANDOLPH, *Examiner.*

A. L. ROTMAN, *Assistant Examiner.*